(12) United States Patent
Elliott (10) Patent No.: US 12,019,466 B2
(45) Date of Patent: Jun. 25, 2024

(54) VIRTUAL PRECISION TIME PROTOCOL CLOCK DEVICES FOR VIRTUAL NODES

(71) Applicant: HEWLETT PACKARD ENTERPRISE DEVELOPMENT LP, Houston, TX (US)

(72) Inventor: Robert C. Elliott, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 120 days.

(21) Appl. No.: 17/660,810

(22) Filed: Apr. 26, 2022

(65) Prior Publication Data
US 2023/0341889 A1    Oct. 26, 2023

(51) Int. Cl.
| G06F 1/12 | (2006.01) |
| G06F 9/455 | (2018.01) |
| G06F 13/42 | (2006.01) |
| H04L 5/00 | (2006.01) |
| H04L 7/00 | (2006.01) |

(52) U.S. Cl.
CPC ............ *G06F 1/12* (2013.01); *G06F 9/45558* (2013.01); *G06F 2009/45595* (2013.01)

(58) Field of Classification Search
CPC .................. G06F 1/12; G06F 9/45558; G06F 2009/45595
See application file for complete search history.

(56) References Cited

U.S. PATENT DOCUMENTS

| 7,412,703 B2 | 8/2008 | Cleary et al. |
| 8,086,890 B2 | 12/2011 | Song |
| 8,185,770 B2 | 5/2012 | Siemens et al. |
| 8,359,488 B2 | 1/2013 | Costa |
| 9,104,343 B2 | 8/2015 | Ruesch et al. |
| 9,344,265 B2 | 5/2016 | Karnes |
| 9,389,885 B2 | 7/2016 | Niesser et al. |
| 9,542,350 B1 * | 1/2017 | Kissell ................ G06F 13/14 |
| 10,042,384 B2 | 8/2018 | Mallada et al. |
| 10,908,941 B2 | 2/2021 | Zhou et al. |
| 11,483,127 B2 * | 10/2022 | Almog ................ G06F 9/455 |
| 2008/0069150 A1 * | 3/2008 | Badt .................... H04J 3/0667 370/252 |

(Continued)

FOREIGN PATENT DOCUMENTS

WO    2018115934 A1    6/2018

OTHER PUBLICATIONS

Deji, "Let's Be Precise: Enabling and Configuring Precision Time Protocol in vSphere", available online at <https://web.archive.org/web/20200429215947/https://docs.microsoft.com/en-us/azure/virtual-machines/linux/time-sync>, Apr. 6, 2021, 6 pages.

(Continued)

*Primary Examiner* — Xuxing Chen
(74) *Attorney, Agent, or Firm* — Trop, Pruner & Hu, P.C.

(57) ABSTRACT

A supervisor provides a plurality of virtual nodes. A storage medium stores a plurality of information elements. A controller, which is separate from the supervisor, provides a plurality of virtual precision time protocol (PTP) clock devices. Each virtual PTP clock device corresponds to an information element. The controller uses the information element corresponding to a given virtual precision time protocol clock device to provide a precision time protocol-based time for the given virtual precision time protocol clock device.

20 Claims, 6 Drawing Sheets

(56) References Cited

U.S. PATENT DOCUMENTS

| | | | |
|---|---|---|---|
| 2016/0112182 A1* | 4/2016 | Karnes | G06F 1/14 |
| | | | 375/362 |
| 2016/0283425 A1* | 9/2016 | Sarangdhar | G06F 13/362 |
| 2017/0180325 A1* | 6/2017 | Palermo | H04L 41/0894 |
| 2019/0007280 A1* | 1/2019 | Sarangam | H04L 43/026 |
| 2020/0356396 A1* | 11/2020 | Bert | G06F 3/0665 |
| 2021/0203427 A1* | 7/2021 | Ambeskar | H04J 3/0697 |
| 2021/0271308 A1 | 9/2021 | Fukushi | |
| 2021/0271500 A1 | 9/2021 | Elliot et al. | |
| 2022/0123849 A1* | 4/2022 | McCall | H04J 3/0658 |
| 2023/0006807 A1* | 1/2023 | Hubbe | G06F 9/45558 |
| 2023/0315144 A1* | 10/2023 | Ma | G06F 1/12 |
| | | | 713/400 |

OTHER PUBLICATIONS

Iana, "Time Zone Database", available online at <https://www.iana.org/time-zones>, Mar. 15, 2022, 2 pages.

Intel, "Intel Registered I/O Controller Hub (Intel Registered ICH) / Platform Controller Hub (PCH) Family Real Time Clock (RTC)", EMTS, Apr. 2012, 20 pages.

Kuznetsov, Vitaly, "An introduction to timekeeping in Linux VMs", OpenSource.com, Jun. 8, 2017, 13 pages.

Microsoft Azure, "Time sync for Linux VMs in Azure", available online at <https://web.archive.org/web/20200429215947/https://docs.microsoft.com/en-us/azure/virtual-machines/linux/time-sync>, Sep. 17, 2018, 6 pages.

Microsoft Docs, "Accurate Time for Windows Server 2016", available online at <https://docs.microsoft.com/en-us/windows-server/networking/windows-time-service/accurate-time>, Nov. 6, 2021, 6 pages.

Microsoft Docs, "Time accuracy improvements for Windows Server 2016", available online at <https://web.archive.org/web/20201112021738/https://docs.microsoft.com/en-us/windows-server/networking/windows-time-service/windows-server-2016-improvements>, Oct. 17, 2018, 30 pages.

Vmware, "vCenter Server and Host Management", 2009, 228 pages.

Vmware, "vSphere Virtual Machine Administration", 2009, 317 pages.

First Office Action for U.S. Appl. No. 16/803,293, dated Feb. 25, 2022; 17 pp.

First Office Action for U.S. Appl. No. 16/803,308, dated Mar. 4, 2022; 14 pp.

* cited by examiner

VIRTUAL PRECISION TIME PROTOCOL CLOCK DEVICES FOR VIRTUAL NODES

BACKGROUND

A bare metal computer platform may maintain a system time in relation to a system clock of the computer platform. The computer platform may use the system clock to timestamp (e.g., assign times via tags representing the times) various events, operations and transactions of the computer platform. For example, the bare metal computer platform may timestamp when a record (e.g., a file) is created or modified; timestamp logged events; timestamp financial transactions; timestamp when emails are received or sent; timestamp security alerts; and so forth. The computer platform may have one or more virtual machines, which may maintain their own respective system clocks to timestamp events, operations and transactions that are associated with the virtual machines.

DETAILED DESCRIPTION

A computer platform may provide one or multiple instances of computing environments. For example, the computer platform may be part of a cloud computing system. The cloud computing system may include a central management subsystem orchestrates a software-defined logical infrastructure and services (e.g., software-defined compute (SDC) services, software-defined storage (SDS) services and software-defined networking (SDN) services), which are hosted on computer platforms of the cloud computing system. As part of providing logical infrastructure and services, the computer platforms may provide computing environment instances.

Among the types of computing environments, a bare metal computing environment is associated with actual hardware and software resources. A virtual computing environment, also referred to as a "virtual node" herein, is an abstraction, or virtualization, of actual hardware and software resources. The computer platform, which contains the actual hardware and software resources, serves as the host for the virtual node.

A virtual machine (which may also be referred to as a "guest virtual machine," a "virtual machine," a "VM instance," a "guest VM" or a "VM") is an example of a virtual node. A VM is a machine level abstraction, which has its own virtualized resources (e.g., CPU(s), system memory, network interface(s) and storage) of the host computer platform. Moreover, a VM may have its own guest operating system. A VM supervisor, also referred to as a virtual machine monitor (VMM), or hypervisor, performs actions to provide the VM instances. In general, the hypervisor may manage the lifecycles of VM instances that execute on the host computer platform, maintain isolation among the VM instances, and provide virtualization services for the VM instances.

A "container" (also referred to as an "instantiated container," "container instance," or "software container"), is another example of a virtual node. A container, in general, is a virtual run-time environment for one or multiple applications and/or application modules, and this virtual run-time environment is constructed to interface to an operating system kernel. A container for a given application may, for example, contain the executable code for the application and its dependencies, such as system tools, libraries, configuration files, executables and binaries for the application. The container contains an operating system kernel mount interface but not an operating system kernel. As such, a given computer platform may, for example, contain multiple containers that share an operating system kernel of the host computer platform through respective operating system kernel mount interfaces. Docker containers and rkt containers are examples of containers. A container supervisor, also referred to as a container engine daemon, performs actions to provide the containers. In general, the container engine daemon may perform actions to build and run the containers.

A given entity (e.g., a virtual node instance or a bare metal instance) that executes on a computer platform may timestamp various events, operations and transactions that are associated with the entities. The entity may maintain a system clock to keep track of the current time while an operating system that is associated with the entity is running. In the context used herein, a "clock" refers to a virtual or actual physical component, or device, which provides a value that represents a time (e.g., a time of day).

The entity may update the time of the system clock responsive to host central processing unit (CPU) clock ticks. Because the memory that is associated with an operating system is cleared when the operating system boots, the operating system that is associated with the entity may not initially know the current time. During boot, the operating system may either take actions to discover the current time, or the operating system may be informed about the time. Because CPU clock ticks are relatively inaccurate (e.g., the CPU oscillator may have a 50 parts per million (ppm) variation, resulting in a drift of about 4.25 seconds per day), the system clock may be regularly refreshed (e.g., periodically re-synchronized to a time represented by another clock) while the operating system executes.

The operating system may acquire the current time (for both the initial value after boot and for subsequent refreshes) from a clock source that is internal to the computer platform or from a clock source that is external to the computer platform. For example, a VM instance may acquire its time from a hypervisor, which is internal to the computer platform. A battery-backed real time clock (RTC) is another example of an internal clock source. Another clock source that may be internal to a computer platform is a hardware-based precision time protocol (PTP) clock device. Clock sources that are external to the computer platform may include network time protocol (NTP) servers and PTP servers.

The clock sources may vary with respect to their accuracies and with respect to their associated costs of implementation. For example, a battery-backed RTC may be relatively less costly to implement but may be less accurate than the clock ticks of the host CPU. A PTP clock source may be relatively more accurate than a battery-backed RTC or NTP clock source but may be relatively more expensive to implement.

NTP and PTP are examples of time synchronization protocols. In general, an entity of a computer platform may use a time synchronization protocol to synchronize a clock of the entity to a reference clock (e.g., for purposes of obtaining an initial clock value representing the time of day and regularly refreshing the clock value thereafter). The accuracies of the time synchronization protocols vary. For example, PTP may have an associated accuracy of 200 nanoseconds (ns) (i.e., a given clock may be synchronized, using the PTP, to within 200 ns of the reference clock), whereas NTP may have an associated relatively lower accuracy of 200 microseconds (µs).

Although potentially more expensive to implement, there may be a number of reasons for using a relatively more precise time synchronization protocol, such as PTP. For example, industry standards and/or governmental regulations may impose precise clock constraints on certain computer-related events, operations and transactions, such as financial transactions, health record transactions, electrical transmission infrastructure event and fault recording, seismic event recording, and so forth. Moreover, there have been a number of security breaches, computer system outages and other computer-related problems that are attributable to time synchronization failures and/or time inaccuracies (e.g., leap second bugs, security attacks, software failures, certificate validation failures, and so forth).

PTP is associated with a hierarchy (or "clock hierarchy") of nodes. The PTP clock hierarchy may form a tree structure. At the root, or beginning, of the tree structure, the clock hierarchy includes a main, or primary, node called the "primary PTP leader" herein. The primary PTP leader maintains the primary reference clock, and the clocks of the other nodes of the PTP clock hierarchy are synchronized to the clock of the primary PTP leader. A given node of the remaining nodes of the PTP clock hierarchy may be either a PTP follower, or both a PTP follower and a PTP leader. In general, a PTP leader (whether the primary PTP leader or another PTP leader) communicates a specific sequence of messages with a PTP follower for purposes of synchronizing the clock of the PTP follower with the clock of the PTP leader. A node that is both a PTP follower and a PTP leader is considered to be a boundary node, and a node that is solely a PTP follower (i.e., a leaf node of the PTP clock hierarchy tree) is considered to be a client node.

As an example, the clock of the primary PTP leader may be synchronized to an atomic clock (e.g., the clock of the primary PTP leader may be synchronized via radio frequency (RF) communication to the U.S. atomic clock at Boulder, CO). As another example, the clock of the primary PTP leader may be synchronized to a global navigation satellite system (GNSS) clock. As a more specific example, a computer platform may include a hardware component, such as a timing card (e.g., a Peripheral Component Interconnect express (PCIe) card) that serves as a primary PTP leader to which the clocks of other PTP followers are synchronized. As another example, a computer platform may have PTP followers that synchronize their clocks to an off-platform PTP leader, such as, for example, a network switch.

A physical, hardware PTP clock device (e.g., a PTP clock device formed from dedicated hardware components, such as a gate array, an application specific integrated circuit (ASIC) and/or a microcontroller or processing core) may be relatively expensive. The expense may be compounded when a computer platform has multiple (e.g., tens to hundreds) VM instances that execute on the computer platform, and PTP clock devices are provided for the respective VM instances.

One approach to provide a PTP clock source for a VM instance (in lieu of a dedicated physical, hardware PTP clock device) involves a hypervisor of the computer platform emulating the hardware PTP clock device for the VM instance. In this manner, the hypervisor may have an emulation layer to emulate hardware PTP clock devices for multiple VM instances such that due to this emulation, the hypervisor provides a virtual PTP clock device to each VM instance. There may be performance and/or security drawbacks with this approach, however. Hypervisor-based emulation of PTP clock devices may introduce latency variations, as other executing entities wait while the hypervisor executes the PTP clock emulation code. For example, NTP clients may implement mathematical filters on the times that the NTP clients receive from the NTP servers to reduce the effects of errant time values. Implementing the mathematical filters may involve some employing math functions (e.g., math functions to add the last n values and divide by n), which consume some CPU cycles. Moreover, using the hypervisor to emulate PTP clock devices may create a security vulnerability for the computer platform. In this manner, for purposes of allowing the guest operating systems to make hypervisor system calls, a specific driver may be provided for each guest operating system. Such paravirtualization may present a highly sensitive security attack surface for breaking into the hypervisor.

In accordance with example implementations that are described herein, a controller of a computer platform emulates physical, hardware PTP clock devices (called "PTP clock devices" herein) to provide corresponding virtual PTP clock devices for respective virtual node instances. The controller-provided PTP clock device emulation may be beneficial for such reasons as reducing a security attack surface of the computer platform. Moreover, the controller-provided PTP clock device emulation may free up processing resources of the computer platform (e.g., free up processing resources, such as freeing up CPU resources that are otherwise used to emulate PTP clock devices as part of an emulation layer of a hypervisor).

In accordance with some implementations, the controller may be a "platform controller," which refers to a controller that performs specified tasks in a computer platform. In some examples, the platform controller is a bus device on a bus, such as a Peripheral Component Interconnect (PCI) bus or a PCIe bus. In other examples, the platform controller can be a bus device connected to another type of bus in a computer platform. A "bus" refers to a communication link over which multiple devices can communicate with one another.

The platform controller may be separate from the main processor(s) of the computer platform. The main processors (s) can execute various machine-readable instructions of the system, such as virtual node instances (e.g., container instances and/or VM instances); operating system instances; application instances; firmware (e.g., boot code, hardware initialization code, etc.); and so forth. The platform controller can be designated to perform specified tasks for the computer platform, including emulating PTP clock devices, as well as other tasks (e.g., power management tasks, thermal management tasks, system monitoring tasks, etc.). In some examples, the platform controller can be a separate system-on-chip that is coupled to the main processor(s). In more specific examples, the platform controller can be made from a smart network interface controller (NIC), or be part of a baseboard management controller (BMC). The platform controller can have its own processing circuitry (that is separate from the main processor(s) executing the operating system and/or other program code of a computer system) and run its own firmware. A BMC is a specialized service processor that can monitor the physical state of the computer platform using sensors. The BMC may communicate with a management system (e.g., communicate with a remote management server) through an independent out-of-band connection.

The BMC may also communicate with applications that are executing at the operating system level through an input/output controller (IOCTL) interface driver, a representational state transfer (REST) application program interface (API), or some other system software proxy that facilitates communication between the BMC and applications. The BMC may have hardware level access to hardware components located in the computer platform. The BMC may be able to directly modify the hardware components. The BMC may operate independently of the operating system of the computer platform in which the BMC is disposed. The BMC may be located on the motherboard or main circuit board of the computer platform to be monitored. The fact that a BMC is mounted on a motherboard of the managed computer platform or otherwise connected or attached to the managed computer platform does not prevent the BMC from being considered separate from a processing resource that executes the operating system. A BMC has management capabilities to manage components of the computer platform. Examples of management capabilities of the BMC can include any or some combination of the following: power control, thermal monitoring and control, fan control, system health monitoring, remote access of the computer system, remote reboot of the computer system, system setup, operating system image deployment and recovery, system security, and so forth.

In some examples, a BMC can provide so-called "lights-out" functionality for a computer platform. The lights out functionality may allow a user, such as a systems administrator to perform management operations on the computer platform, even if an operating system is not installed or not functional on the computer platform. Moreover, in some examples, the BMC can run on auxiliary power (e.g., battery power or an auxiliary power rail). As a result, the computer platform does not have to be powered on to allow the BMC to perform its operations. The services provided by the BMC may be considered "out-of-band" services, since the operating system may not be running. In some cases, the BMC may provide out-of-band services, via a management channel, when all or part of the remainder of the computer platform is powered off or is not functioning properly (e.g., the computer platform has experienced a fault or hardware failure).

A platform controller may be part of an entity other than a bus device or a BMC. For example, the platform controller may be a chassis management controller. Regardless of its particular form, in accordance with example implementations, the platform controller provides a separate physical processor (separate from the main processor(s) of the computer platform) in which PTP clock device emulation can be provided in a secure manner. For example, in accordance with example implementations, the platform controller is protected against attacks which may affect operations of the main processor(s), such as when malware infects a computer platform and executes on the main processor(s).

Offloading PTP clock device emulation to the platform controller reduces the overhead of the main processors, which may otherwise be incurred to generate virtual PTP clock devices. In accordance with example implementations, a portion of a PCI memory is assigned to include information elements that are individually associated with respective virtual node instances (e.g., VM instances or container instances). In accordance with example implementations, the information element may be a register or a set of registers. Each register set includes registers that may be accessed for purposes of communicating messages related to synchronizing the clocks of the virtual node instances with the respective virtual PTP clock devices. The platform controller may detect accesses of the registers in the PCI memory portion, which allows the platform controller to generate appropriate responses to emulate PTP clock devices.

Figure 1:
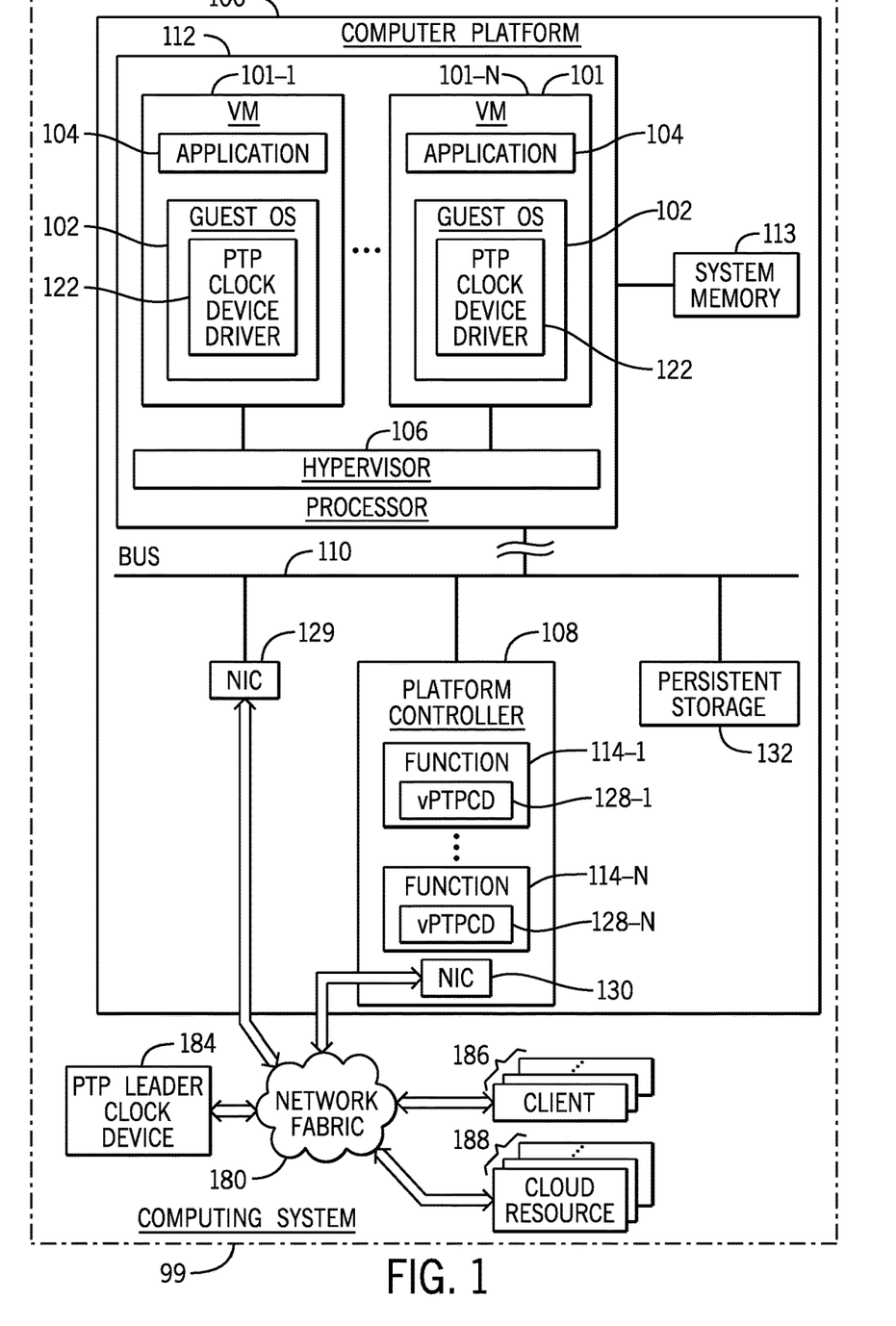
FIG. 1 is a block diagram of a computer platform having a platform controller that provides virtual Precision Time Protocol (PTP) clock devices for virtual machines of the computer platform according to an example implementation.

Referring to FIG. 1, as a more specific example, in accordance with some implementations, a computing system 99 may include one or multiple computer platforms 100. In accordance with some implementations, the computer platform 100 may be part of a computer network. In accordance with further implementations, the computer platform 100 may be a standalone platform. For the example implementation that is depicted in FIG. 1, the computing system 99 is a cloud computing system, and one or multiple computer platforms 100 form corresponding domain nodes of the cloud computing system. In accordance with example implementations, the computer platform 100 may be one of multiple cloud resources 188, which are interconnected to each other and to one or multiple clients 186 (i.e., clients associated with cloud tenants) via network fabric 180.

In general, the network fabric 180 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

As used herein, a "computer platform" refers to a modular unit, which includes a frame, or chassis. Moreover, this modular unit may include hardware that is mounted to the chassis and is capable of executing machine-executable instructions. A blade server is an example of the computer platform 100, in accordance with an example implementation. The computer platform 100 may, however, be any of a number of different platforms other than a blade server, in accordance with further implementations, such as a rack-mounted server, a client, a desktop, a smartphone, a laptop computer, a tablet computer, a modular switch, a compute node, storage array, a cluster node, wearable computer and so forth.

The computer platform 100, in accordance with example implementations, includes N virtual node instances, where "N" is an integer greater than or equal to one. According to an example, the virtual node instance may be a VM instance. FIG. 1 specially depicts VM instance 101-1 to VM instance 101-N. It is noted that although the following discussion describes example implementations in which the virtual node instances are VM instances, in accordance with further implementations, the virtual node instances may be other types of virtual computing environments, such as, for example, container instances. In accordance with further example implementations, a computer platform may execute different types of virtual node instances, such as VM instances and container instances. Regardless of the specific implementation of the virtual node or types of virtual node instances executing on a computer platform, the computer platform includes one or multiple supervisors that provide one or multiple virtual node instances; and the computer platform includes a controller other than the supervisor(s), which provides emulated PTP clock device(s) for respective virtual node instance(s). For the specific example implementation that is depicted in FIG. 1, the supervisor is a hypervisor 106. In accordance with a further example implementation, the virtual node instances are container instances, and the supervisor may be a container engine daemon. In accordance with yet further example implementations, the virtual node instances may be VM instances and container instances having respective container engine daemon-based and hypervisor-based supervisors.

Referring to the example implementation that is depicted in FIG. 1, the VM instances 101 can be started on demand by a user or other entity. The computer platform 100 can start with zero VM instances 101, and additional VM instance(s) 101 may be started when requested. Each VM instance 101, in accordance with example implementations, includes a respective guest operating system instance 102 (or "guest operating system"). The guest operating system instance 102 may correspond to a LINUX operating system, a WINDOWS operating system, and/or another type of operating system. The different guest operating system instances 102 can be of the same type or of different types. Each VM instance 101 can also include one or multiple application program instances 104 (or "application programs 104") executing in the VM instance 101. Note that prior to the creation of a VM instance 101, there is no guest operating system instance 102 and no application program instance 104.

The computer platform 100, in accordance with example implementations, includes a hypervisor 106. The hypervisor 106 may, in general, provide the VM instances 101. In this manner, the hypervisor 106 may create the VM instances 101 and manage the execution of the VM instances 101. The hypervisor 106 may emulate physical resources of the computer platform 100, which are accessible by the VM instances 101. Moreover, the hypervisor 106 may provide isolation among the VM instances 101 and perform various virtualization tasks for the VM instances 101.

In accordance with example implementations, instead of emulating a PTP clock device using the hypervisor 106, the PTP clock device emulation is offloaded to a platform controller 108 of the computer platform 100. In accordance with example implementations, the platform controller 108 is a bus device on a bus 110 of the computer platform 100. As an example, the bus 110 may be a PCIe bus. In accordance with further example implementations, the bus 110 may be a type of bus other than a PCIe bus. Moreover, in accordance with further implementations, the platform controller 108 may be coupled to communication fabric other than a bus.

The platform controller 108 can be implemented using any type of hardware processing circuitry, including, as examples, hardware processing circuitry that includes one or multiple microcontrollers, one or multiple programmable integrated circuit devices (e.g., one or multiple ASICs, one or multiple programmable gate arrays, one or multiple microprocessor processing cores, and so forth).

In some examples, the platform controller 108 is separate and distinct from the one or multiple main processors 112 of the computer platform 100. The main processor 112 may include one or multiple microprocessors; one or multiple cores of a multi-core microprocessor; one or multiple microcontrollers; one or multiple programmable integrated circuits; one or multiple programmable gate array; one or multiple digital signal processors; one or multiple other hardware processing circuits; and so forth.

In general, the platform controller 108 may take on one of many different architectures, depending on the particular implementation. As examples, the platform controller 108 may be part of a smart NIC, a smart input/output (I/O) peripheral, a BMC, a chassis management controller, and so forth. Regardless of its particular implementation, the platform controller 108 is separate from the main processor(s) 112 and performs specified tasks in the computer platform 100.

The main processor(s) 112 are coupled to the bus 110, either directly or through another device, such as a bridge device. In accordance with example implementations, the main processor(s) 112 execute machine-readable instructions of the computer platform 100, including instructions to form the hypervisor 106, instructions to form the VM instances 101, instructions to form a host operating system (if present), as well as other instructions associated with other software programs and/or firmware programs.

As depicted in FIG. 1, in accordance with example implementations, the main processor(s) 112 may be coupled to a system memory 113. The system memory 113 is a non-transitory storage medium and may include one or multiple memory devices to store data and machine-readable instructions. A memory device can include a volatile memory device, such as a dynamic random access memory (DRAM) device; a static random access memory (SRAM) device; and so forth. Alternatively, a memory device can include a nonvolatile memory device. Although not shown, the system memory 113 can include a memory controller, or alternatively, a memory controller may be connected to the memory device(s) to control access of data in the memory device(s).

Devices of the computer platform 100 other than the main processor(s) 112 and the platform controller 108 may be coupled to the bus 110, in accordance with example implementations. For example, in accordance with some implementations, one or multiple network interface controllers (NICs) 129 and a persistent storage 132 may be coupled to the bus 110. In accordance with example implementations, components of the computer platform 100, including the VM instances 101, use the NIC 129 to communicate with entities of the computing system 99 that are external to the computer platform 100. In accordance with some implementations, components of the computer platform 100, including the VM instances 101, may communicate with entities of the computing system 99 via one or multiple NICs 130 of the platform controller 108 using passthrough communications.

The persistent storage 132 can store data that persists, even if power is removed from the computer platform 100 or from the persistent storage 132. The persistent storage 132 can be implemented using a nonvolatile storage device (or multiple nonvolatile storage devices). A nonvolatile storage device can include a flash memory device, a disk-based storage device, and so forth.

In accordance with example implementations, the platform controller 108 performs PTP clock device emulation using PCI functions 114. FIG. 1 depicts N PCI functions 114 (PCI function 114-1 to 114-N, being depicted in FIG. 1), and in accordance with example implementations, the hypervisor 106 may assign a PCI function 114 to each VM instance 101. In accordance with example implementations, the hypervisor 106 may assign multiple PCI functions 114 to a given VM instance 101. As depicted in FIG. 1, in accordance with example implementations, the PCI functions 114 contain respective virtual PTP clock devices (vPTPCDs) 128 (depicted in FIG. 1 as N vPTPCDs 128-1 to 128-N being provided via PCI functions 114-1 to 114-N, respectively).

A PTP leader (e.g., a vPTPCD 128) may communicate a sequence of messages with a PTP follower (e.g., a VM instance 101) for purposes of synchronizing a clock of the PTP follower with a clock of the PTP leader. In accordance with example implementations, the sequence of messages includes an initial synchronization message. More specifically, in accordance with example implementations, the PTP leader reads a value of its clock, generates a synchronization message containing the read clock value, and transmits the synchronization message. The synchronization message is received by the PTP follower, and responsive to receiving the synchronization message, the PTP follower records a timestamp (called a "first timestamp" herein), which represents the time (referenced to the PTP follower's clock) at which the PTP follower received the synchronization message.

There is a time difference between the time that the PTP leader reads the value of its clock and the time that the PTP follower receives the synchronization message. This time difference contains two components, and the PTP follower uses the information that is derived from the sequence of messages to determine these components for purposes of determining an adjustment to make to the clock value sent via the synchronization message.

A first component of the time difference is the propagation delay of the communication path between the PTP leader and the PTP follower. A second component of the time difference is the time that elapses from the time that the PTP leader reads the clock value to the time that the PTP leader transmits the synchronization message to the communication path.

For purposes of the PTP follower deriving the second component of the time difference, the sequence of messages may include a second message called a "follow-up message." The PTP leader transmits the follow-up message. The follow-up message contains data that represents a timestamp (called a "second timestamp" herein) showing the actual time (referenced to the PTP leader's clock) at which the PTP leader transmitted the synchronization message to the communication path. The PTP follower may determine the second component of the time difference based on the first timestamp (representing the time at which the synchronization message was received by the PTP follower) and the second timestamp (representing the time that the PTP leader transmitted the synchronization message).

For purposes of providing the PTP follower with information to determine the first component (i.e., the propagation delay) of the time difference, the sequence of messages may contain two additional messages sent following the synchronization message. More specifically, after receipt of the follow-up message, the PTP follower may transmit a delay request message to the PTP leader and record a timestamp (called the "third timestamp" herein), which represents the time (referenced to the PTP follower clock) of the transmission of the delay request message. The PTP leader receives the delay request message and records a timestamp (referred to as the "fourth timestamp" herein), which represents the time (referenced to the PTP leader clock) at which the delay request message was received. The PTP leader may then transmit a delay response message to the PTP follower. The delay response message contains data that represents the fourth timestamp. The PTP follower may determine the second component (i.e., the propagation delay) of the time difference based on the third timestamp and the fourth timestamp.

When the PTP follower determines the time difference between the time that the PTP leader reads the value of its clock and the time that the PTP follower receives the synchronization message, the PTP follower may then derive, based on the PTP leader's clock value and the time difference, the adjustment to make to the PTP follower's clock to synchronize the PTP follower's clock to the PTP leader's clock.

A PTP follower and a PTP leader may communicate messages other than the sequence of messages that are described herein for purposes of synchronizing the clock of the PTP follower with a clock of the PTP leader, in accordance with further implementations.

In the context that is used herein, "synchronizing" a first clock to a second clock refers to undertaking one or multiple actions to coordinate the first clock with the second clock. The synchronization may or may not result in the first clock and the second clock being exactly the same, and moreover, the first clock and second clocks may drift apart (or further apart) after the synchronization. In accordance with example implementations, a PTP follower may regularly (e.g., periodically) synchronize its clock with the clock of a PTP leader. In this manner, in accordance with some implementations, the PTP leader may, at a regular time interval, initiate a sequence of messages corresponding to clock synchronization, where each sequence of messages begins with the PTP leader transmitting a synchronization message and ends with the PTP leader transmitting a delay response message.

In accordance with some implementations, the sequence of messages communicated between a PTP leader and a PTP follower may follow a protocol that is described in the IEEE 1588-2019 Specification, which was published in 2020. In accordance with further implementations, the sequence of messages communicated between a PTP leader and a PTP follower may follow a protocol according to a version of the IEEE 1588 Specification, other than the IEEE 1588-2019 Specification. Moreover, in accordance with yet further implementations, the sequence of messages communicated between a PTP leader and a PTP follower may follow a protocol other than an IEEE 1588 Specification-based protocol.

In accordance with example implementations, the computing system 99 may include an actual, or physical, PTP leader clock device 184. In accordance with some implementations, the PTP leader clock device 184 may be the primary PTP leader for a corresponding PTP clock hierarchy. For example, in accordance with some implementations, the PTP leader clock device 184 may contain a GNSS radio to receive a GNSS signal that indicates a time of day, and the PTP clock device 184 sets its clock, the primary clock to this time. As another example, the PTP leader clock device 184 may include an RF radio that receives a signal (e.g., a frequency modulation (FM) signal corresponding to a dedicated FM channel) to synchronize the primary clock of the PTP leader clock device 184 to an atomic clock. In accordance with some implementations, the PTP leader clock device 184 may be a network component, such as a network switch (e.g., a top-of-the-rack (ToR) switch), which may be part of the network fabric 180. In accordance with further example implementations, the PTP leader clock device 184 may be a boundary node of the clock hierarchy, which synchronizes its clock to another PTP leader. Moreover, in accordance with further implementations, the PTP leader clock device 184 may be a device (e.g., a bus device, such as a PCIe bus device) of the computer platform 100.

In accordance with example implementations, the vPTPCD 128 functions as a boundary node of the PTP clock hierarchy. In this manner, the vPTPCD 128, in accordance with example implementations, serves as a PTP follower, which communicates messages with the PTP leader clock device 184 for purposes of synchronizing a clock of the vPTPCD 128 with a clock of the PTP leader clock device 184. Moreover, the vPTPCD 128 functions as a PTP leader to communicate messages with a given VM instance 101 for purposes of the VM instance 101 synchronizing its clock with the clock of the vPTPCD 128.

Figure 2:
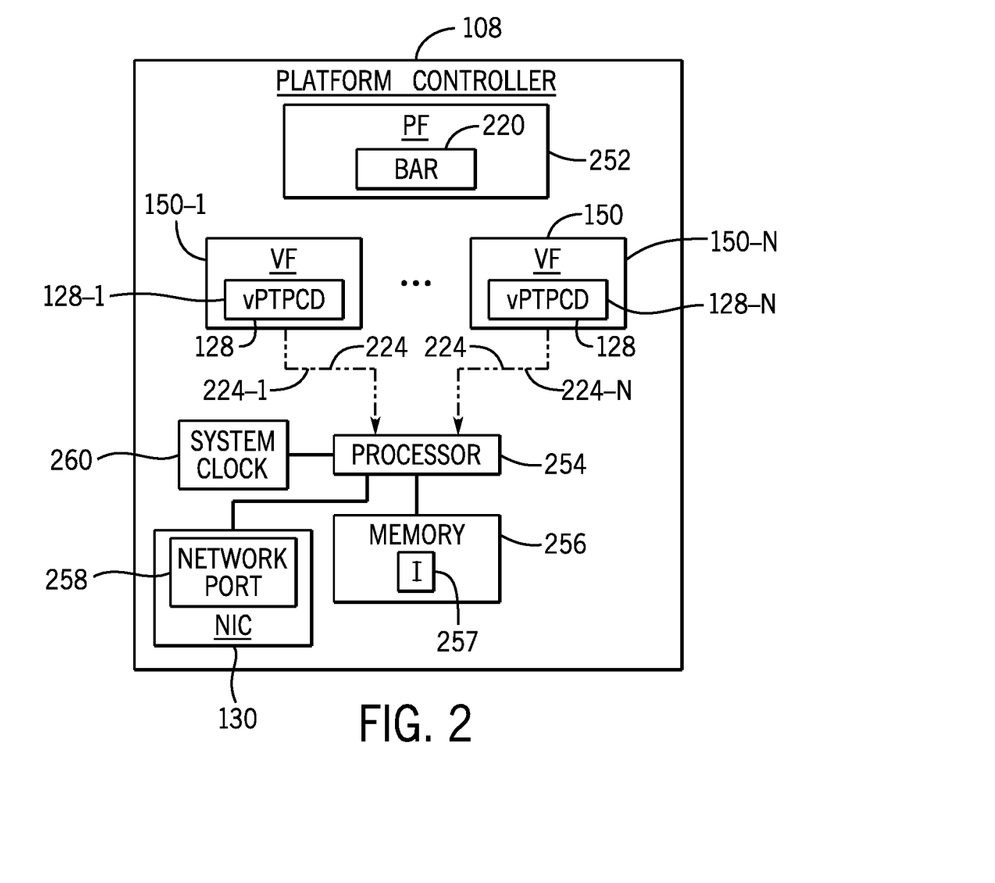
FIG. 2 is a block diagram of the platform controller of FIG. 1 according to an example implementation.

FIG. 2 depicts further details of the platform controller 108 according to example implementations. Referring to FIG. 2 in conjunction with FIG. 1, in accordance with example implementations, the PCI functions 114 are implemented as virtual functions (VFs) 150 (or "virtual function instances"). FIG. 2 depicts N virtual functions 150-1 to 150-N. In accordance with example implementations, the VFs 150 are according to PCIe single root I/O virtualization (SR-IOV), as defined by a PCI Special Interest Group (SIG), which is a community that defines standards (including the SR-IOV Specification) relating to PCIe.

In accordance with example implementations, each VF 150 contains a corresponding vPTPCD 128. Moreover, in accordance with example implementations, each VF 150 may be assigned to a respective single VM instance 101. For example, the vPTPCD 128-1 emulates a PTP clock device for VM 101-1, and the vPTPCD 128-N emulates a PTP clock device for VM 101-N. In accordance with further example implementations, a given VF 150 may be assigned to multiple VM instances 101.

In accordance with further example implementations, one or multiple PCI functions 114 may be implemented as functions (e.g., physical PCI functions) other than virtual functions.

SR-IOV allows a PCIe device (such as vPTPCD 128 implemented by the platform controller 108) to present itself to a host (e.g., the computer platform 100) as multiple distinct virtual devices. The PCIe device (e.g., the platform controller 108) implements a PCIe physical function (PF) 252 that is partitioned into multiple VFs 150 (e.g., N VFs 150-1 to 150-N for the example implementation depicted in FIG. 2) for the purpose of sharing the PCIe device's resources in a virtual environment.

The PF 252 provides control over the creation and allocation of VFs 150. The PF 252 contains an SR-IOV capability structure, and the PF 252 manages the SR-IOV functionality. In accordance with example implementations, the PF 252 can be discovered, managed, and manipulated like any other PCIe device in the computer platform 100. In accordance with example implementations, the VFs 150 share the platform controller's underlying hardware and PCIe interface to the PCI bus 110.

As depicted in FIG. 2, in accordance with example implementations, the platform controller 108 includes one or multiple processors 254 and a memory 256. The processor (s) 254 is to execute instructions 257 (e.g., instructions stored in the memory 257) of the platform controller 108 to perform tasks of the platform controller 108. The processor (s) 254, in accordance with example implementations, may include one or multiple processing cores, one or multiple microcontrollers, one of multiple ASICs, one or multiple programmable gate arrays, and so forth. The memory 256 is a non-transitory storage medium and may include one or multiple memory devices to store data and machine-readable instructions. Although not shown, the memory 256 can include a memory controller, or alternatively, a memory controller may be connected to the memory device(s) to control access of data in the memory device(s).

In accordance with example implementations, the platform controller 108 is a PTP follower, and the platform controller 108 synchronizes its system clock 260 to the clock of a PTP leader, More specifically, in accordance with example implementations, the processor(s) 254 execute instructions (e.g. a subset of instructions 257) to communicate PTP messages with the PTP leader clock device 184 (FIG. 1) via a network port 258 (e.g., an Ethernet port) of the platform controller's NIC 130 for purposes of synchronizing the system clock 260 to the clock of the PTP leader clock device 184. The platform controller 108 therefore, at certain adjustment times, calibrates its system clock 260 responsive to PTP message communication with the PTP leader clock device 184. Hardware of the platform controller 108, in lieu of the execution of instructions or in combination with the execution of instructions, may communicate PTP messages with the PTP leader clock device 184, in accordance with further implementations. In accordance with example implementations, responsive to a VM instance 101 reading a clock register of a vPTPCD 128 (e.g., responsive to a read request from a VM instance 101 directed to the clock register), the platform controller 108 reads the current value of the system clock 260, adjusts the value based on the number of platform controller clock ticks since the last adjustment time, and returns a clock value to the VM instance 101 representing a PTP clock time. Depending on the particular implementation, the platform controller 108 may perform these actions by executing instructions, using hardware of the platform controller 108, or via a combination of instruction execution and hardware.

In accordance with example implementations, SR-IOV enables PTP clock device activations by the VM instances 101 to bypass an emulation layer in the hypervisor 106. The VFs 150, according to SR-IOV, are lightweight so that a large number of the VFs 150 can be implemented in the platform controller 108. For example, if the computer platform 100 includes a large number of VM instances 101, a corresponding large number of VFs 150 can be implemented on the platform controller 108 to perform PTP clock device emulation for the respective VM instances 101.

An SR-IOV-capable device (e.g., the platform controller 108) can be configured (such as by the hypervisor 106 or another entity of the computer platform 100) to appear in the PCI memory space as multiple VFs 150, where each VF 150 has its own PCI memory space. A PCI memory can refer to a portion of memory space in the computer platform 100 that includes structures that can be used by an entity (e.g., a VM instance 101 or any other entity) of the computer platform 100 to interact with a corresponding PCI device, such as any of the VFs 150.

In accordance with example implementations, to perform PTP clock device emulation, each VF 150 has a class code that represents a PTP clock device. According to PCI, a class code is a three-byte field in a function's configuration space header that identifies a functionality of the function. For example, a class code can include a base class sub-field (one byte in length, for example), a subclass sub-field (one byte in length, for example), and a programming interface sub-field (one byte in length, for example). The base class sub-field broadly classifies the type of functionality that the VF 150 provides. The subclass sub-field more specifically identifies the type of functionality that the VF 150 provides. The programming interface sub-field identifies the specific register-level interface (if any) of a VF 150, so that a device-independent software (e.g., a VM) can interact with the VF 150.

In accordance with example implementations, in the hypervisor 106, instead of emulating PTP clock devices at specific memory space addresses, each VM instance 101 can be assigned its respective VF 150. Therefore, depending on the particular implementation, multiple VM instances 101 may share a VF 150, or VM instances 101 may each have their own VF 150.

Figure 3:
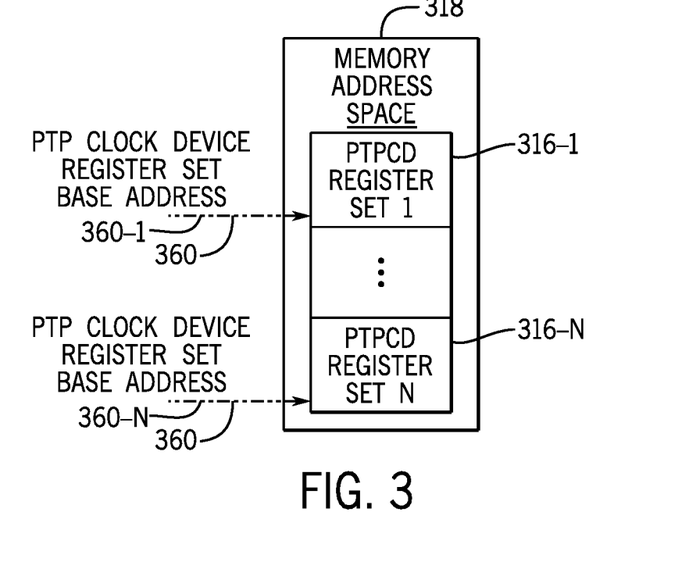
FIG. 3 is a block diagram of a memory address space associated with the virtual PTP clock devices according to example implementations.

FIG. 3 depicts a memory address space 318 of the computer platform 100 according to an example implementation. Referring to FIG. 3 in conjunction with FIGS. 1 and 2, in accordance with some implementations, the VM instance 101 can recognize, based on the base class sub-field and the subclass sub-field together, that a VF 150 is providing the functionality of a PTP clock device. The programming interface sub-field can identify a PTP clock device information element. In accordance with example implementations, an information element may be a register or multiple registers, such as a PTP clock device register set 316. FIG. 3 depicts N PTP clock device register sets 316-1 to 316-N. In this way, a VM instance 101 can read a PTP clock value from a register of a PTP clock device register set 316, and the platform controller 108 synchronizes this PTP clock value with the clock of a PTP leader, such as the PTP leader clock device 184 (FIG. 1), as described herein.

In accordance with example implementations, the PTP clock device register set 316 is part of a corresponding vPTPCD 128. The PTP clock device register set 316 in the corresponding vPTPCD 128 is mapped to the memory address space 318, and more specifically, to PCI memory in the memory address space 318. The memory address space 318 can be implemented with a number of storage devices in the computer platform 100, including the system memory 113 of FIG. 1, registers in the platform controller 108, and so forth. In accordance with example implementations, the PTP clock device register sets 316 include memory-mapped registers that are part of the memory address space 318.

In accordance with further example implementations, such as in examples where the functions 114 are PFs, the PTP clock device register sets 316 may be part of an I/O address space of the computer platform 100.

Memory addresses of the memory address space 318 can be mapped to a memory controller and/or a PCIe controller. The memory controller is connected to a memory device (or alternatively, multiple memory devices). A memory device can include a volatile memory device (e.g., a dynamic random access memory or DRAM device, a static random access memory or SRAM device, etc.). Alternatively, a memory device can include a nonvolatile memory device (e.g., a flash memory device, etc.). A PCIe controller is connected to a PCIe device. A PCIe device can support memory accesses, but they may not really access memory devices such as DRAMs or SRAMs. Instead, a PCIe device may access memory-mapped registers that are part of the memory address space 318.

In accordance with example implementations, the starting address (or base address) of the PCI memory space for each PTP clock device register set 316 is based on a memory address contained in a PCI base address register (BAR) 220 (FIG. 2), which is in the PCI configuration space. The PCI BAR 220 is included in the PF 252, as depicted in FIG. 2. PCI defines multiple BARs that can be used to hold various memory addresses for a PCI device or function.

FIG. 3 depicts N example base addresses 360-1 to 360-N for respective PTP clock device register sets 316. In accordance with example implementations, the base addresses 360 are derived based on the memory address that is contained in the BAR 220 (FIG. 2), and the hypervisor 106 writes the memory address to the BAR 220. The memory address that is contained in the BAR 220 defines a chunk of PCI memory space that is to be partitioned evenly across the VFs 150. The defined chunk of PCI memory space has a size BARSIZE. Each VF 150 may be assigned a portion of the chunk of PCI memory space of size BARSIZE/N (where "N" is the number of VFs 150). The base address 360 of the PCI memory containing a given PTP clock device register set 316 is computed based on the VF number of the corresponding VF 150 in conjunction with the memory address contained in the BAR 220.

Referring to FIG. 1 in conjunction with FIG. 2, in accordance with example implementations, a PTP clock device driver 122 (FIG. 1) or another program that is in a VM instance 101 is able to access the PCI memory space of the corresponding VF 150. In accordance with example implementations, each guest operating system 102 may include a PTP dock device driver 122. In accordance with some implementations, a guest operating system 102 in a VM instance 101 may include an application programming interface (API) that allows a PTP dock device driver 122 of the VM instance 101 to access the PCI memory space of the corresponding VF 150.

After SR-IOV is enabled in the PF 252 of the platform controller 108, the VFs 150 are available for enumeration by configuration software running on the main processor 112 and can be accessed by bus, device and function. The configuration software, which in some examples is the hypervisor 106, can then configure the desired number of VFs 150 from those supported by the PF 252 and assign resources accordingly (i.e., assign a portion of the memory space 318 for the VFs 150 by programming the BAR 220). Once complete, the PTP clock device register sets 316 are addressable by the processor 112.

Referring to FIG. 1 in conjunction with FIG. 3, in accordance with example implementations, the PTP clock device driver 122 of the guest operating system 102 is able to query the hypervisor 106 to obtain the corresponding base address 360 of the PTP clock device register set 316 of the corresponding vPTPCD 128. This allows the PTP clock device driver 122 of the guest operating system 102 to communicate messages with a vPTPCD 128 to synchronize a clock of the VM instance 101 to a clock of the vPTPCD 128.

In examples where the guest operating system 102 is unable to automatically detect a PTP clock device (e.g., the guest operating system 102 is unable to recognize the base class/subclass/programming interface values for a PTP clock device discussed above), the address for the PTP clock device can be provided to the guest operating system 102 in a different way. An example of a guest operating system that is unable to automatically detect PCI PTP clock devices is the LINUX operating system. In accordance with example implementations, the address for a PTP clock device can be provided to the guest operating system 102 by including the address in a kernel command line used to launch the guest operating system 102. In accordance with further implementations, other ways of providing the address for a PTP clock device to the guest operating system 102 may be used.

In accordance with example implementations, each vPTPCD 128 may include write detection logic to detect writes to the corresponding PTP clock register set 316 and/or read detection logic to detect reads from the corresponding PTP clock register set 316. The write detection logic is able to detect writes by VM instances 101 or other entities to the PTP clock device register sets 316 of the respective vPTPCDs 128. Writes of registers to the PTP clock device register sets 316 by the VM instances 101 can be performed as part of the PTP messaging. For example, the VM instances 101 may write to the registers to send PTP delay request messages to the vPTPCD 128.

Reads of the registers of the PTP clock device register sets 316 can also be performed as part of the PTP messaging. For example, the VM instances 101 may read from the registers to receive messages sent by the vPTPCD 128, such as PTP synchronization messages, PTP follow-up messages and PTP delay response messages.

Referring to FIG. 2 in conjunction with FIG. 1, in response to a write or read, the write or read detection logic in the vPTPCD 128 can signal an interrupt to the processor 254 of the platform controller 108, such as using a respective PTP clock device indication 224 (N PTP clock device indications 224-1 to 224-N being depicted in FIG. 2). The PTP clock device indication 224 can indicate which register of the registers of the PTP clock device register set 316 has been written to or read from. The PTP clock indication 224 can include a signal, an interrupt, a command, or any other indication relating to PTP synchronization messaging operations or, in general, operations related to communications with the vPTPCDs 128. The PTP clock device indication 224 can include information that identifies the associated VF 150 and the register to which the read/write occurred.

In response to a PTP clock device indication 224, machine-readable instructions (e.g., firmware) running on the processor 254 can synthesize an appropriate response for the corresponding vPTPCD 128. In accordance with further implementations, the platform controller 108 contains hardware that synthesizes the response under the orchestration of machine-readable instructions (e.g., firmware) running on the processor 254. For example, data transmitted from the PTP clock device driver 122 may be intercepted by the vPTPCD 128 and placed directly into a circular buffer (or other storage structure) associated with the VM instance 101.

Other implementations are contemplated, which are within the scope of the appended claims. For example, referring back to FIG. 2, in accordance with further implementations, the platform controller 108 may synchronize its system clock 260 to a clock source other than a PTP leader. As a more specific example, in accordance with some implementations, the platform controller 108 may include a GNSS receiver that receives a GNSS signal (e.g., a composite signal representing received transmissions from multiple GNSS satellites). The platform controller 108 may process the GNSS signal to synchronize the clock 260 to the satellite clock of the closest satellite. This processing may, for example, involve the platform controller 108 decoding the GNSS signal into content attributable to multiple satellites; the platform controller 108 determining a physical location of the GNSS receiver and identifying the closest satellite based on the decoded content; the platform controller 108, based on the decoded content, determining a satellite clock value provided by the closest satellite; and the platform controller 108 compensating for a delay that is associated with the satellite clock value. For these example implementations, the platform controller 108 may be considered a PTP leader. In accordance with further implementations, the platform controller 108 may communicate with an NTP provider (e.g., an NTP server) for purposes of using NTP to synchronize the clock 260 to the clock of the NTP provider. For these example implementations, the platform controller 108 is an NTP client, and the platform controller 108 is a PTP leader for the vPTPCDs 128.

Figure 4:
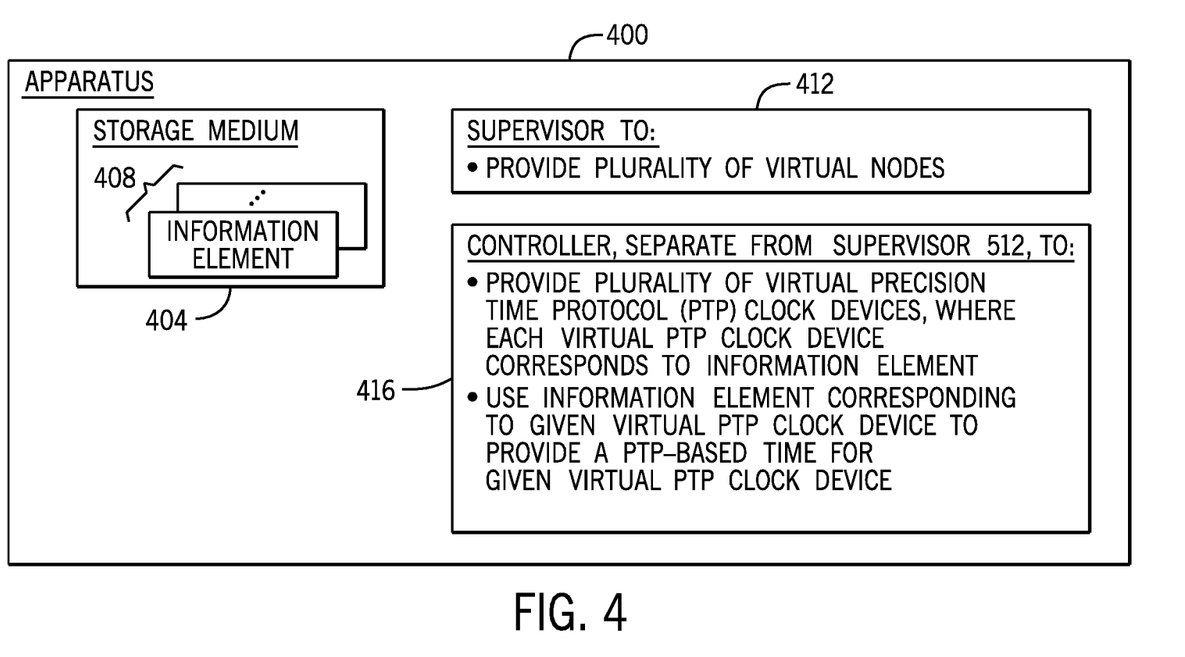
FIG. 4 is a block diagram of an apparatus having a controller that provides virtual PTP clock devices for virtual nodes of the apparatus according to an example implementation.

Referring to FIG. 4, in accordance with example implementations, an apparatus 400 includes a storage medium 404; a supervisor 412; and a controller 416. In accordance with example implementations, the supervisor 412 may be a hypervisor, such as the hypervisor 106 of FIG. 1, or a container engine daemon. As examples, the controller 416 may be a platform controller, such as the platform controller 108 of FIGS. 1 and 2. The storage medium 404 stores a plurality of information elements 408. As examples, the information elements 408 may be corresponding registers or register sets, such as the PTPCD register sets 316 of FIG. 3. The supervisor 412 provides a plurality of virtual nodes. As examples, the virtual nodes may be virtual machine instances, such as the VM instances 101 of FIG. 1 and/or container instances. The controller 416 is separate from the supervisor 412. The controller 416 is to provide a plurality of virtual PTP clock devices, such as, for example, the vPTPCDs 128 of FIGS. 1 and 2. Each virtual PTP clock device corresponds to an information element 404. The controller 416 to use the information element 404 corresponding to a given virtual PTP clock device to provide a PTP-based time for the given virtual PTP clock device.

Figure 5:
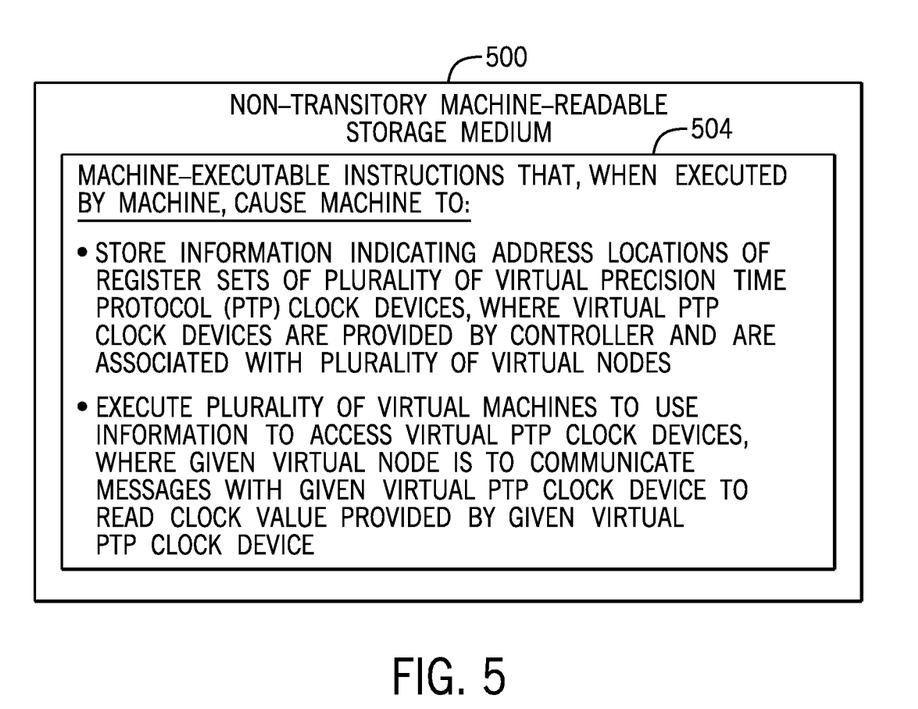
FIG. 5 is an illustration of a non-transitory machine-readable storage medium that stores machine-executable executions that, when executed, cause a machine to execute virtual nodes, which access virtual PTP clock devices according to an example implementation.

Referring to FIG. 5, in accordance with example implementations, a non-transitory machine-readable storage medium 500 stores machine-executable instructions 504. The instructions 504, when executed by a machine, cause the machine to store information indicating address locations of register sets of a plurality of virtual PTP clock devices. As examples, the register sets may be the PTPCD register sets of FIG. 3, and the virtual PTP clock devices may be the vPTPCDs 128 of FIGS. 1 and 2. The virtual PTP clock devices are provided by a controller and are associated with a plurality of virtual nodes. As examples, the controller 416 may be a platform controller, such as the platform controller 108 of FIGS. 1 and 2. As examples, the virtual nodes may be virtual machine instances, such as the VM instances 101 of FIG. 1 and/or container instances. The instructions 504, when executed by the machine, further cause the machine to execute the virtual nodes to use the information to access the virtual PTP clock devices. A given virtual machine communicates with a given virtual PTP clock device to read a clock value that is provided by the given virtual PTP clock device.

Figure 6:
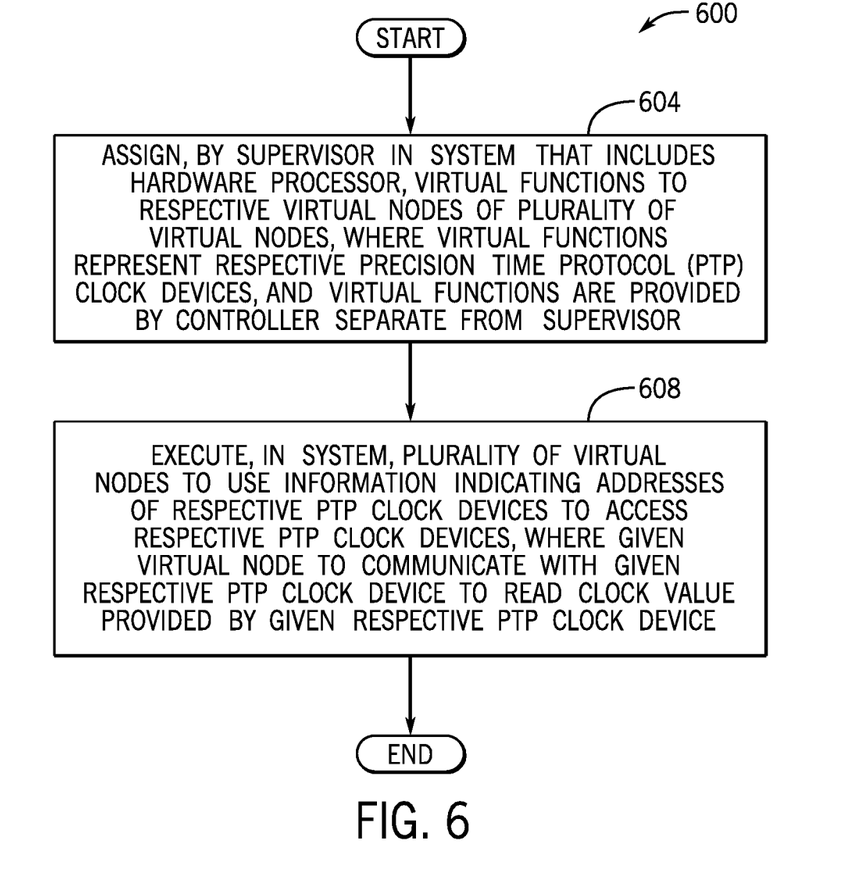
FIG. 6 is a flow diagram depicting a process to provide virtual PTP clock devices for virtual nodes according to an example implementation.

Referring to FIG. 6, in accordance with example implementations, a process 600 includes assigning (block 604), by a supervisor in a system that includes a hardware processor, virtual functions to respective virtual nodes. As an example, the supervisor may be a container engine daemon or a hypervisor, such as the hypervisor 106 of FIG. 1. Processor 112 of FIG. 1 is an example of the hardware processor. The virtual functions may be PCI virtual functions, such as the virtual functions 150 of FIG. 2. As examples, the virtual nodes may be virtual machine instances, such as the VM instances 101 of FIG. 1, or container instances. The virtual functions represent respective PTP clock devices. As examples, the PTP clock devices may be virtual clock devices, such as the vPTPCD clock devices 128 of FIGS. 1 and 2. The virtual functions are provided by a controller, which is separate from the supervisor. The process 600 further includes executing (block 608), in the system, the virtual nodes to use information indicating addresses of the respective virtual functions to access the respective PTP clock devices. As an example, the information may be information provided by a register or a register set, such as the register sets 316 of FIG. 3. A given virtual node communicates with a given respective PTP clock device to read a clock value that is provided by the given respective PTP clock device.

In accordance with example implementations, the virtual nodes may be virtual machines or containers. Particular advantages may include a reduction in the main processing overhead and a reduction in a security attack surface.

In accordance with example implementations, the controller includes a clock. The controller to communicate with a precision time protocol leader clock device to synchronize the clock of the controller to a clock of the precision time protocol leader clock device. The controller to provide the precision time protocol-based time based on a value of the clock of the controller. Particular advantages may include a reduction in the main processing overhead and a reduction in a security attack surface.

In accordance with example implementations, the precision time protocol leader clock device is part of a network switch. Particular advantages may include a reduction in the main processing overhead and a reduction in a security attack surface.

In accordance with example implementations, the controller to synchronize the clock of the controller at adjustment times. A given virtual node is to read a register of the controller corresponding to the given virtual precision time protocol clock device and responsive to the read of the register. The controller to, responsive to the read, adjust the value of the clock of the controller based on a most recent adjustment time of the adjustment times to provide an adjusted clock value, and provide the adjusted clock value to the given virtual node. Particular advantages may include a reduction in the main processing overhead and a reduction in a security attack surface.

In accordance with example implementations, the controller to communicate messages with the precision time protocol leader device. The messages include a synchronization message that is provided by the precision time protocol leader device. The synchronization message includes data representing a clock value of the precision time protocol leader device and a first timestamp associated with the clock value of the precision time protocol leader device. Particular advantages may include a reduction in the main processing overhead and a reduction in a security attack surface.

In accordance with example implementations, the messages further include a follow-up message and a delay request message. The follow-up message is provided by the precision time protocol leader device, and the follow-up message includes data representing a time at which the given precision time protocol leader device transmitted the synchronization message. The delay request message is provided by the controller, and the delay request message includes data representing a time at which the controller transmitted the delay request message. Particular advantages may include a reduction in the main processing overhead and a reduction in a security attack surface.

In accordance with example implementations, the controller includes a global navigation satellite system (GNSS) receiver to receive a GNSS signal. The controller to provide the precision time protocol-based time based on the GNSS signal. Particular advantages may include a reduction in the main processing overhead and a reduction in a security attack surface.

In accordance with example implementations, each information element of the plurality of information elements corresponds to a register set of a plurality of register sets. The plurality of registers sets is in a memory address space of a computer platform. Particular advantages may include a reduction in the main processing overhead and a reduction in a security attack surface.

In accordance with example implementations, the information elements include base address registers. Each base address register contains a memory address for deriving an address for the corresponding virtual PTP clock device. Particular advantages may include a reduction in the main processing overhead and a reduction in a security attack surface.

In accordance with example implementations, the supervisor includes one of a hypervisor or a container engine, and the controller includes a baseboard management controller. Particular advantages may include a reduction in the main processing overhead and a reduction in a security attack surface.

In accordance with example implementations, each virtual precision time protocol clock device corresponds to a different virtual function of a plurality of virtual functions, and the controller provides the plurality of virtual functions. Particular advantages may include a reduction in the main processing overhead and a reduction in a security attack surface.

In accordance with example implementations, the supervisor is to assign the given virtual machine to the virtual function that corresponds to the given virtual PTP clock device. Particular advantages may include a reduction in the main processing overhead and a reduction in a security attack surface.

In accordance with example implementations, the controller includes a clock. The controller to communicate with a network time protocol (NTP) provider to synchronize the clock of the controller with a clock of the NTP provider. The controller to provide the precision time protocol-based time based on a value of the clock of the controller. Particular advantages may include a reduction in the main processing overhead and a reduction in a security attack surface.

In accordance with example implementations, the supervisor is to associate multiple virtual PTP clock devices with the given virtual node. Particular advantages may include a reduction in the main processing overhead and a reduction in a security attack surface.

In accordance with example implementations, multiple virtual precision time protocol clock devices correspond to one virtual function, and the controller provides the one virtual function. Particular advantages may include a reduction in the main processing overhead and a reduction in a security attack surface.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:
1. An apparatus comprising:
   a storage medium to store a plurality of information elements;
   a supervisor to provide a plurality of virtual nodes; and
   a controller separate from the supervisor to provide a plurality of virtual precision time protocol clock devices, wherein:

each virtual precision time protocol clock device of the plurality of virtual precision time protocol clock devices corresponds to an information element of the plurality information elements;

the controller to use the information element corresponding to a given virtual precision time protocol clock device of the plurality of virtual precision time protocol clock devices to provide a precision time protocol-based time for the given virtual precision time protocol clock device; and the controller providing the precision time protocol-based time comprises communicating, by the given virtual precision time protocol clock device and with a given virtual node of the plurality of virtual nodes, a sequence of precision time protocol-based messages to synchronize a clock of the given virtual node with the precision time protocol-based time.

2. The apparatus of claim 1, wherein the plurality of virtual nodes comprises at least one of a plurality of virtual machines or a plurality of containers.

3. The apparatus of claim 1, wherein:
the controller comprises a clock;
the controller to communicate with a precision time protocol leader clock device to synchronize the clock of the controller to a clock of the precision time protocol leader clock device; and
the controller to provide the precision time protocol-based time based on a value of the clock of the controller.

4. The apparatus of claim 3, wherein the precision time protocol leader clock device is part of a network switch.

5. The apparatus of claim 3, wherein:
the controller to synchronize the clock of the controller at adjustment times;
the given virtual node is to read a register of the controller corresponding to the given virtual precision time protocol clock device and responsive to the read of the register; and
the controller to, responsive to the read, adjust the value of the clock of the controller based on a most recent adjustment time of the adjustment times to provide an adjusted clock value, and provide the adjusted clock value to the given virtual node.

6. The apparatus of claim 3, wherein the controller to communicate messages with the precision time protocol leader device, the messages comprise a synchronization message provided by the precision time protocol leader device, and the synchronization message comprises data representing a clock value of the precision time protocol leader device and a first timestamp associated with the clock value of the precision time protocol leader device.

7. The apparatus of claim 6, wherein the messages further comprise:
a follow-up message provided by the precision time protocol leader device, the follow-up message comprising data representing a time at which the given precision time protocol leader device transmitted the synchronization message; and
a delay request message provided by the controller, the delay request message comprising data representing a time at which the controller transmitted the delay request message.

8. The apparatus of claim 1, wherein:
the controller comprises a global navigation satellite system (GNSS) receiver to receive a GNSS signal; and
the controller to provide the precision time protocol-based time based on the GNSS signal.

9. The apparatus of claim 1, wherein each information element of the plurality of information elements corresponds to a register set of a plurality of register sets, and
the plurality of registers sets is in a memory address space of a computer platform.

10. The apparatus of claim 1, wherein the plurality of information elements comprises a plurality of base address registers, wherein each base address register of the plurality of base registers contains a memory address for deriving an address for the corresponding virtual precision time protocol clock device.

11. The apparatus of claim 1, wherein the supervisor comprises one of a hypervisor or a container engine, and the controller comprises a baseboard management controller.

12. The apparatus of claim 1, wherein each virtual precision time protocol clock device of the plurality of virtual precision time protocol devices corresponds to a different virtual function of a plurality of virtual functions, and the controller provides the plurality of virtual functions.

13. The apparatus of claim 1, wherein:
the controller comprises a clock;
the controller to communicate with a network time protocol (NTP) provider to synchronize the clock of the controller with a clock of the NTP provider; and
the controller to provide the precision time protocol-based time based on a value of the clock of the controller.

14. The apparatus of claim 1, wherein the supervisor is to associate multiple virtual precision protocol clock devices with the given virtual node.

15. The apparatus of claim 1, wherein multiple virtual precision time protocol clock devices of the plurality of virtual precision time protocol devices correspond to one virtual function, and the controller provides the one virtual function.

16. A non-transitory machine-readable storage medium storing machine-executable instructions that, when executed by a machine, cause the machine to:
store information indicating address locations of register sets of a plurality of virtual precision time protocol clock devices, wherein the virtual precision time protocol clock devices are provided by a controller and are associated with a plurality of virtual nodes; and
execute the plurality of virtual nodes to use the information to access the plurality of virtual precision time protocol clock devices, wherein a given virtual node of the plurality of virtual nodes is to communicate with a given virtual precision time protocol clock device of the virtual precision time protocol clock devices a sequence of precision time protocol-based messages to synchronize a clock of the given virtual node with a precision time protocol-based time.

17. The storage medium of claim 16, wherein the information comprises memory addresses of the register sets.

18. The storage medium of claim 16, wherein the plurality of virtual precision time protocol clock devices comprises a plurality of virtual machines or a plurality of containers.

19. A method comprising:
assigning, by a supervisor in a system comprising a hardware processor, virtual functions to respective virtual nodes of a plurality of virtual nodes, wherein the virtual functions represent respective precision time protocol clock devices, and the virtual functions are provided by a controller separate from the supervisor; and
executing, in the system, the plurality of virtual nodes to use information indicating addresses of the respective precision time protocol clock devices to access the respective precision time protocol clock devices, wherein a given virtual node of the plurality of virtual nodes to communicate a sequence of precision time protocol-based messages with a given respective precision time protocol clock device of the respective precision time protocol clock devices to synchronize a clock of the given virtual node with a precision time protocol-based time.

20. The method of claim 19, wherein the plurality of virtual nodes comprises at least one of a plurality of virtual machines or a plurality of containers.

* * * * *